Aug. 2, 1966   P. A. BELLIERE   3,263,754
PRESSURE FLUID ACTUATOR SYSTEM
Filed July 21, 1964   2 Sheets-Sheet 1
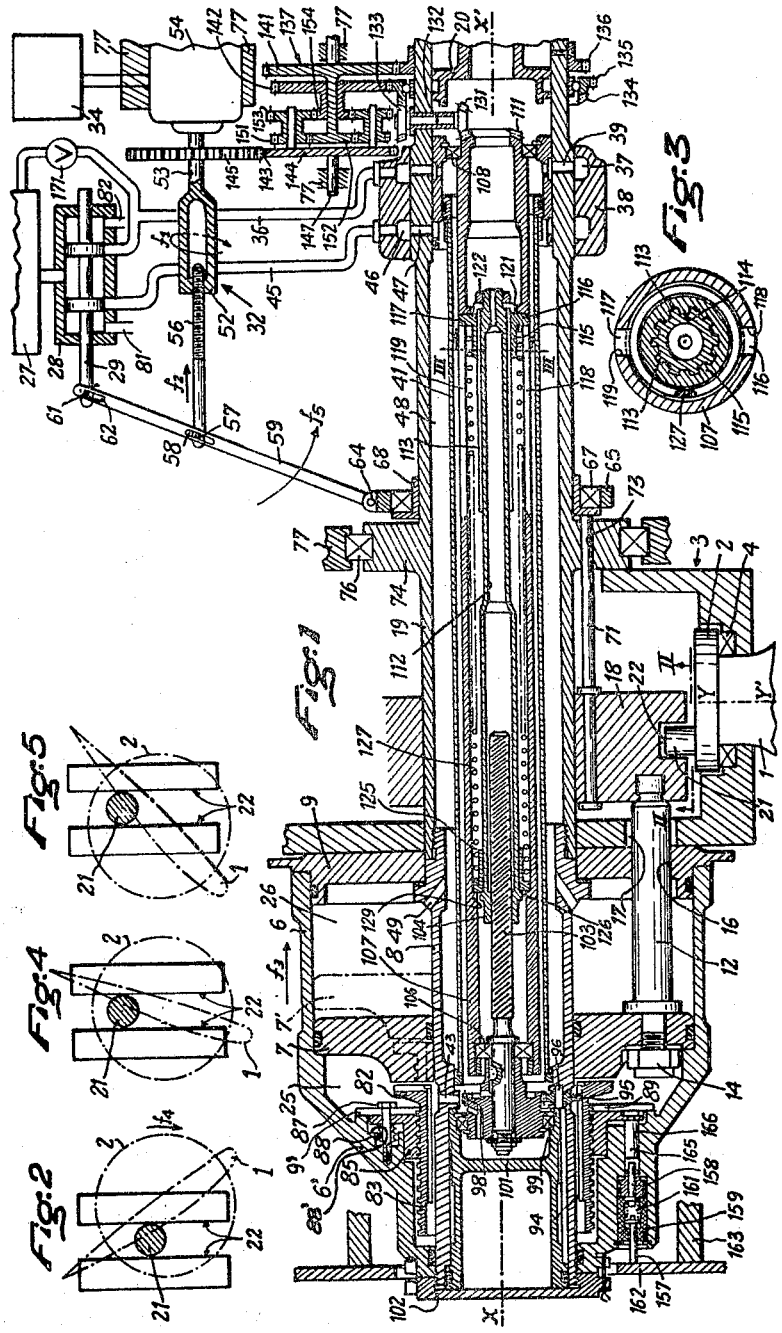

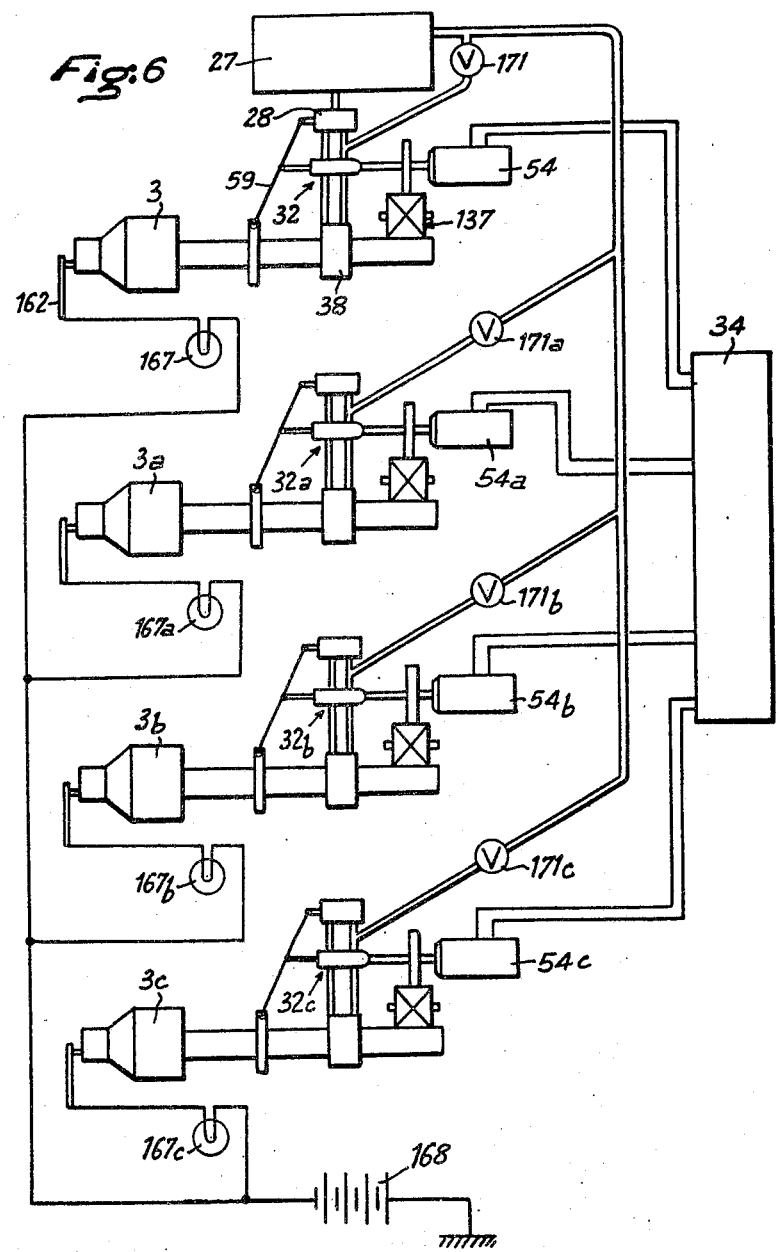

United States Patent Office 3,263,754
Patented August 2, 1966

1

3,263,754
PRESSURE FLUID ACTUATOR SYSTEM
Pierre Alfred Belliere, Viroflay, France, assignor to Societe Anonyme dite: Ratier Figeac, Orly (Seine), France
Filed July 21, 1964, Ser. No. 384,121
Claims priority, application France, Mar. 5, 1964, 966,144, Patent 1,395,753
15 Claims. (Cl. 170—160.32)

This invention relates to pressure fluid control systems of the general type including a two-part pressure fluid actuator, usually in the form of a cylinder and a piston displaceable therein, connected to a source of pressure fluid by way of a control valve so that selective displacement of the valve will produce a desired relative displacement of one actuator part relative to the other.

No matter how carefully a pressure fluid system is designed, constructed and serviced, there is an ever-present danger of a defect arising in the circuitry of the system, as a break in piping or other cause of leakage, and such danger is especially present in the case of hydraulic systems containing a limited supply of hydraulic liquid, although it is present also in pneumatic systems. Failure in the fluid circuitry may permit, or occasionally even positively force, the movable actuator part to perform an unwanted displacement away from its prescribed setting. While such occurrence is troublesome in all cases, there are certain applications in which such an unwanted displacement of a pressure fluid actuator may have extremely grave consequences.

One such application, with which the invention is especially though not exclusively concerned, is in the field of aircraft propeller pitch control. A widely used form of propeller pitch control device comprises a hydraulic cylinder-and-piston actuator mounted in the propeller hub coaxially therewith and having its axially displaceable part, usually the piston, connected through a camming arrangement with the propeller blades so that displacement of said piston in the cylinder will rotate all said blades simultaneously to alter their pitch. Piston displacement in one direction rotates the blades in a direction to increase their pitch angle, while piston displacement in the opposite direction rotates the blades in a direction to reduce, and ultimately reverse, said pitch angle. The actuator piston displacements are controlled through a servo-system including a hydraulic control valve and a follow-up connection, and the valve is operated from a manual and/or automatic control station, by way of a control mechanism acting on the control valve to displace it in a selected direction from a neutral position.

In case of a failure in the hydraulic system of such a propeller pitch controller, the movable actuator part may be permitted, or forced, to move in a direction corresponding to a reduction in the pitch angle of the blades. This may result in a dangerous loss of control over the aircraft; furthermore, should the pitch-reducing displacement be allowed to continue until the pitch angle has actually been reversed, as would normally occur, a crash would be the probable outcome.

To avert this danger it has been proposed to provide a retractable limiting abutment or safety stop engageable with the actuator piston to prevent the piston from moving beyond a position corresponding to a predetermined low safety limit of blade pitch angles. With such an arrangement the safety stop has to be retracted when it is desired to reduce the pitch below said limit as is often desired in certain flight configurations, e.g. on landing, especially in the case of short take-off and landing craft, inflatable wing craft, and the like. Once the limit stop has been retracted, of course, there is no longer any safety means in action so that the dangerous condition is present again.

It is an object of this invention to provide an improved pressure fluid control system embodying novel safety abutment means, and one that will be especially, though not exclusively, useful in connection with an air propeller pitch controller. More specific objects include the provision of such a system which will include some or all of the following advantageous features:

The safety abutment means will be in the nature of a follower abutment, i.e. it will be continually positioned from control mechanism actuating the control valve of the pressure-fluid actuator, to a setting corresponding to the desired setting of the displaceable actuator part, so as to abut said displaceable part in case of system failure and prevent its being moved away substantially from its said desired setting.

The system will embody a "command-storing" or "synchronizer" coupling in the drive transmission from the control mechanism to the follower abutment, whereby in case of system failure and consequent abutment of the displaceable actuator part against said abutment, subsequent command movements of the control system will be stored in said coupling and, when said actuator part is eventually disengaged from the abutment (as after repair of the defect or through operation of emergency means which may be provided in accordance with an additional object of the invention), the follower abutment will automatically assume the setting commanded at this time by the control mechanism regardless of any intervening command movements performed by said mechanism during the defective period.

The system will be applicable to actuators arranged for rapid rotation about an axis, e.g. propeller pitch control actuators mounted in a propeller hub.

Various further objects and the novel features of this invention will stand out from the ensuing description of an exemplary embodiment illustrated in the accompanying drawings wherein:

FIG. 1 is a longitudinal sectional view, partly schematic, of an air propeller pitch controller embodying features of the invention;

FIG. 2 is a partial cross section on line II—II of FIG. 1;

FIG. 3 is a cross section on a larger scale, on line III—III of FIG. 1;

FIGS. 4 and 5 are views similar to FIG. 2, relating to different angular settings of the propellor blades; and FIG. 6 is a general schematic view of the four propellers of a four-engine aircraft each provided with pitch controller means of the type shown in FIG. 1.

The propeller-pitch control system illustrated in FIGS. 1–3 comprises a number of propeller blades such as 1 each having its shank mounted for rotation by means of a flange 2 and bearing 4 in a related socket formed in a propeller hub generally designated 3. All the blades 1 have their center lines YY' positioned in a common plane normal to the center line XX' of the propellor hub 3.

Selectively operable means are provided for positively increasing or decreasing the pitch angle of the propeller blades, and it will be understood that such selectively operable means may be manual or automatic, and may be the sole means provided for controlling the said pitch angle, or may be provided in addition to conventional means, not shown, for controlling the propeller pitch angle as a function, e.g. of engine speed. In the illustrated embodiment the selective pitch control means comprises a double-acting hydraulic actuator having an actuator cylinder 6 secured coaxially with the propeller hub 3 for rotation therewith, through any appropriate means. A piston 7 is axially slidable within the cylinder 6 in sliding sealing relation both with the inner wall of the cylinder 6 and with the peripheral cylindrical wall surface of a guide sleeve member 8 extending axially of the cylinder and having one end secured to the end wall 9 thereof.

The actuator piston 7 is connected to the blades 1 through camming linkage whereby axial displacement of the piston in cylinder 6 will rotate all the blades 1 synchronously about their axes YY', and said linkage herein is constructed as follows. A camming ring member 18 is mounted for non-rotating axial displacement around a sleeve member 19 secured to and extending coaxially through the propellor hub 3 as an extension of sleeve 8, and said camming ring member 18 has a circumferential groove 22 formed in its periphery, which groove freely receives therein pins 21 projecting from the inner flanges 2 of the respective blade shanks. The camming ring member 18 is connected for bodily axial displacement with the actuator piston 7 by way of a set of link rods such as 12 uniformly spaced circumferentially and having their one ends secured to the piston 7, as by means of the screw thread and nut connection shown at 14, and their opposite ends secured in sockets formed in the camming ring member 18. The link rods 12 extend freely through holes 16 and 17 formed through the adjacent walls of the actuator cylinder 6 and propeller hub 3. It will be understood that with this arrangement axial displacement of actuator piston 7 in one or the other direction will rotate the blades 1 about their respective center lines YY' in corresponding directions. Thus in FIG. 1 piston 7 is shown in one end position in which the blades 1 are angularly positioned in the manner indicated in FIG. 2, which is a reverse-pitch position. If piston 7 is shifted axially rightward from the full-line position shown i.e. to the intermediate position shown in chain lines at 7', the blades 1 are rotated through the linkage described to angular positions such as shown in FIG. 4, which is a low forward-pitch position, and further axial displacement of piston 7 in the rightward direction would bring the blades 1 to positions such as indicated in FIG. 5 in which the forward pitch angle is relatively large.

Pressure liquid from a source 27 can be selectively delivered to either end of the actuator cylinder 7 by way of a control or servo-valve 28 shown as being of the type having an axially slidable spool or valve member 29 provided with lands and grooves cooperating with ports in the casing of valve 28. The valve member 29 is actuated by way of control mechanism generally designated 32 and later described, from a pilot's control station or other command station, manual or automatic, schematically indicated at 34.

It will be noted that the afore-mentioned sleeve member 19 which is rotatable with the propeller hub is journalled for rotation in fixed frame structure partly shown at 77 by way of bearings such as 76 surrounding a radial flange 74 of said sleeve member. The inner end (herein the right-hand end) of sleeve member 19 is sealed by means of a plug partly shown at 20. An inner sleeve 41 is mounted coaxially within the sleeve 19 and is bodily rotatable with it, having one end secured to the inner surface of sleeve 19 in sealed relation with it, and its opposite end similarly secured to the inner surface of sleeve 8 which constitutes in effect an extension of sleeve 19. The sleeve 19 and inner sleeve 41 define between them an annular space 48.

The actuator cylinder 6 includes as shown a cylindrical main section in which piston 7 is slidable between end positions defined by shoulders in said main section, and a conical nose section 6' beyond one end, herein the left-hand end, of said main section. A first fluid pressure chamber 25 is defined in the nose section 6' to the left of the left-hand end position of piston 7 and this chamber 25 communicates by ways of suitable passages, as shown, including radial passages 43 in the sleeve 8, with the interior space of inner sleeve 41. A second fluid pressure chamber 26 is defined in the main section of the actuator cylinder 6 to the right of the piston and communicates by way of oblique passages 49 formed through sleeve 8 with the annular space 48.

The servo-valve 28 has a pair of motor ports connected by way of lines 36 and 45 respectively with the actuator chambers 25 and 26. For this purpose there is provided a stationary distributor ring 38 which surrounds an end part of the rotatable outer sleeve 19, in sealing engagement with it. The distributor ring 38 has axially spaced grooves 37 and 46 therein, which connect at all times with radial passages such as 39 and 47, respectively, formed in the wall of sleeve 19. The hydraulic lines 36 and 45 connect by way of suitable unions as shown with the respective grooves 37 and 46. Passage 39 connects as shown with the interior of inner sleeve 41 and hence through the passages 43 with actuator chamber 25. Passage 47 connects with the annular space 48 and hence through the passages 49 with the actuator chamber 26.

It will be apparent from the drawing and in view of the connections just described that when valve member 29 is shifted rightward from the neutral position shown, pressure source 27 is connected with line 36 and hence with actuator chamber 25 while an exhaust port 81 of the valve 28 is simultaneously connected with line 45 and hence with actuator chamber 26, thus producing rightward displacement of piston 7 in actuator cylinder 6. Conversely, when valve member 29 is shifted leftward, source 27 is connected with line 45 and hence with chamber 26 while an exhaust port 82 is simultaneously connected with line 36 and hence with chamber 25, producing leftward displacement of the piston 7.

The control mechanism 32 for axially actuating valve member 29 from command station 34 may include a reversible apparatus or drive motor 54 selectively rotatable from a suitable reversing switch, not shown, at station 34 and having a tubular nut member 52 coaxially secured on its output or drive shaft 53. The nut member 52 is engaged by a non-rotatable but axially shiftable screw rod 56 having an end pin 57 slidably coupled with an intermediate portion of a lever 59 by means of a slot 58 in the lever. The upper end of lever 59 has a slot 62 therein for coupling with a pin 61 projecting from the outer end of valve member 29. Thus rotation of drive shaft 53 in one direction, say that indicated by arrow f1, will displace screw rod 56 in one axial direction, say rightward as indicated by arrow f2, and since the lower end of lever 59 is at this time relatively stationary as will presently appear, valve member 29 is axially shifted in a similar, rightward direction. Reverse rotation of drive shaft 53 will similarly cause leftward shifting of valve member 29. The lower end of lever 59 is pivoted by a pin 64 to a lug projecting from a ring 65 which is journalled by way of a bearing 67 around a follow-up ring 68 which is mounted around the outer sleeve 19 for rotation with said sleeve and for axial displacement with respect to it. Ring 68 is connected for axial displacement with the camming ring member 18 by way of one or more rods such as 71 having their ends secured to members 68 and 18, respectively, and slidably extending through holes 73 formed in flange 74, thereby providing a conventional mechanical follow-up connection for returning the valve member 29 to its neutral position as will appear in greater detail presently.

To sum up the operation of the pitch control system as so far described, it is indicated that, in the neutral position of valve member 29 shown in FIG. 1, both lines 36 and 45 and hence both actuator chambers 25 and 26 are blocked off both from pressure source 27 and from exhaust, so that the actuator piston 7 is hydraulically locked in actuator cylinder 6 in the particular setting to which it was previously positioned. If then control 34 is operated to rotate shaft 53 in the direction indicated by arrow $f1$, a desired amount, valve member 29 is shifted in the corresponding direction $f2$ i.e. rightward from neutral, and causes a corresponding rightward, displacement of piston 7 from its said position (as indicated by arrow $f3$) all as earlier described. The piston displacement acting through link rods 12 displaces camming member ring 18 in the same direction to alter the angular setting of blades 1, the blades being rotated as indicated by arrow $f4$ in FIG. 2 in a sense to increase their pitch angle under the conditions assumed above. As camming ring member 18 is axially displaced to alter the blade pitch angle, it displaces through links 71 the follow-up ring 68, rightward under the assumed conditions, whereby lever 59 is now rotated as indicated by arrow $f5$ about pin 57 as a stationary fulcrum, and its upper end shifts valve member 29 in the axial direction reverse from that of its previous displacement (i.e. shifts it leftward under the conditions considered above) until the valve member has been returned to its neutral position, thereby hydraulically locking the piston 7 in its new position and the blades 1 in their new angular setting. Obviously, reverse rotation of drive shaft 53 would produce a sequence of actions reverse from those described, and a reduction in the blade pitch setting.

The system so far described is, broadly, conventional. Safety abutment means according to this invention will now be described, whereby a displacement of actuator piston 7 in the pitch-reducing direction, i.e. leftward as here shown, beyond the desired setting as commanded through the mechanism 32 is positively prevented. Such an unwanted displacement of piston 7 might otherwise take place as a result of a defect in the hydraulic control circuit thereof, due e.g. to a leakage of the hydraulic liquid.

The safety arrangement of the invention includes a follower abutment disk 82 positioned coaxially with and leftward from the piston 7 so as to provide, at the rightwardly directed face of said disk, a movable abutment for the adjacent left face of the piston 7. As will be described, the disk or plate 82 is axially displaced from control mechanism 32 during the command displacements thereof so as to follow up at all times the position of the piston 7.

Disk 82 has a tubular hub 83 of relatively great length extending axially from it away from piston 7 and having a screw thread formed around its outer periphery. This screw thread engages a corresponding internal screw thread in the hub of a flanged backing member or alarm member 85. The backing member 85 is supported for limited yielding axial displacement from the inner wall surface of the conical nose section 6′ of actuator cylinder 6. As shown, the flange of backing member 85 is formed with holes slidable around the shanks of screws such as 87 which are threaded in sockets of said nose section 6′ and serve to retain a stop plate 89 in a fixed axial position relative to said nose section 6′ with said plate abutting an annular stop surface 9′ of section 6′ as shown. Stacked spring washers 88 surrounding the screws 87 urge the flange of backing member 85 rightward into engagement with the left face of stop plate 89 while being yieldable to permit a slight leftward movement of backing member 85 away from stop plate 89, and into abutment with another annular stop surface 88′.

The follower abutment disk 82 is rotated relatively to member 85 and hence axially displaced, from the control mechanism 32 through the means now to be described.

The tubular hub 83 of follower abutment disk or plate 82 is formed internally with annular gear teeth 94 of long axial extent, and the resulting elongated gear annulus is engaged by a pinion 95 which is rotatable on a pivot pin 96 projecting in an axial direction from the rear surface of the wall of sleeve member 8. Pinion 95 in turn is engaged by a gear 98 mounted coaxially with the propeller hub. Gear 98 is rotatably supported in the inner race of a bearing 99 the outer race of which is secured in a tubular part 101 secured coaxially within the sleeve members 8 and retained by means of a screw cap 102 as shown. The gear 98 is secured on the outer end of a shaft which has a screw rod 103 integral with its inner end. The screw rod 103 engages a tubular nut member 104, and the complementary threads of screw rod 103 and tubular nut member 104 are so formed, being preferably of square cross section and inclined with a 45° pitch, as to provide a reversible drive connection between said screw and nut.

A tubular member 107 coaxial with and spaced inward of the inner sleeve member 41 is rotatably supported at one end by means of a bearing 106 around the shaft of screw rod 103 and is rotatably supported at its remote end by means of a bearing 108 in the outer sleeve member 19. It will be noted that the shaft of screw rod 103 is held in a fixed axial position with respect to the propeller hub 3 through its supporting bearing 99, and the tubular member 107 is likewise held in a fixed axial position by both spaced bearings 106 and 108.

The tubular member 107 at its remote end is formed with a coaxial bevel pinion 111 adapted to be driven from the drive shaft 53 of the control mechanism 32 as will be presently described.

The tubular nut member 104 has a tubular extension member 112 extending coaxially from it and which is formed with external splines 113 in an end portion thereof, said splines being in axially sliding engagement with inner splines 114 (also see FIG. 3) formed in a ring member 115 which, accordingly, is axially slidable over the outer end portion of tubular extension member 112. The ring 115 has a pair of tenons 116 and 117 projecting in diametrically opposed relation outwardly therefrom, which tenons are slidable in respective longitudinal slots 118 and 119 formed in the tubular member 107. To prevent the ring member 115 from escaping outwardly (rightward) from the extremity of tubular extension member 112, there is provided an annular retainer 121 surrounding a threaded end portion of the tubular extension member 112 and held thereon by a nut 122.

Slidable on the opposite or inner (herein left) end of the tubular extension member 112, is a further ring 125. The outer surface of tubular extension member 112 has an annular stop shoulder 126 formed around it, and the further ring 125 is normally urged leftward into engagement with shoulder 126 by a helical compression spring 127 mounted in the annular space defined between the coaxial tubular members 112 and 107, with the opposite end of spring 127 engaging the first-mentioned ring member 115. The tubular member 107 has an annular stop shoulder 129 formed in its inner surface which also is engageable by the ring 125. The axial spacing between annular stop shoulder 129 and the outer (right-hand) end surfaces of the slots 118 and 119 in tubular member 107 is made strictly equal to the axial spacing between annular stop shoulder 126 and the annular retainer 121 secured at the end of tubular extension member 112. A convenient way of obtaining such equality is through thickness adjustment of the annular retainer 121.

With the arrangement described, it will be apparent that, under normal conditions, rotation of the pinion 111 mounted at the end of tubular member 107 causes the gear 98 provided at the remote end of screw shaft 103 to rotate bodily therewith, by way of a drive connection which includes the tenons 116, 117 of ring member 115 engaging the slots 118, 119 of tubular member 107, the said ring member 115, the cooperating splines 114 of ring member 115 engaging the splines 113 of tubular extension member 112, the said tubular extension member 112, the nut member 104 integral therewith, and the screw shaft 103 engaging the nut and carrying the gear 98 thereon. So long as the torque transmitted through this drive connection does not exceed a prescribed limit as determined by the selected strength of spring 127, the driving connection operates as just described to transfer such torque from pinion 111 to gear 98. Should however the transmitted torque exceed such value, as is the case when gear 98 is subjected to a high rotational resistance as will be later described, then the screw shaft 103 can be considered as blocked against rotation and the compression spring 127 yields to permit rotation of the nut member 104 relative to the screw shaft 103. It will be noted that this torque limiting action is effective for either direction of rotation of the input gear 111. If gear 111 is rotated in one sense, nut member 104 is rotated in a corresponding sense and will be forced by the blocked screw shaft 103 in engagement with it to move in one axial direction relatively to said screw shaft e.g. leftward. Left-hand ring 125 then remains stationary in abutment with outer shoulder 129 while tubular extension member 112 and right-hand ring member 115 are shifted leftward with the ring tenons 116 and 117 sliding leftward in the slots 118 and 119 of the tubular member 107, thereby compressing the spring 127. If gear 111 and hence nut member 104 are rotated in the opposite sense, nut member 104 will be forced by the blocked screw shaft 103 in the other axial direction, i.e. rightward. Right-hand ring member 115 then remains stationary in abutment with the outer ends of slots 118 and 119 while the left-hand ring 125 is shifted rightward by the shoulder 126 of nut member 104 thereby again compressing the spring 127.

It will thus be seen that there is provided, between the gears 111 and 98, a two-way torque-limiting, yielding drive coupling. The drive connection from shaft 53 to gear 111 will now be described.

Gear 111 is engaged by a pinion 131 carried by a shaft 132 rotatable in the wall of outer sleeve member 19 in radial relation thereto. Shaft 132 carries at its outer end a bevel pinion 133 which engages a bevel annulus 134 which is freely rotatable around the outer periphery of sleeve member 19; as by means of a ball bearing. The bevel annulus 134 is integrally formed, as shown, with a spur gear annulus 135 projecting radially outward from it and engaging one, 142, of the two output gears of a differential gearing generally designated 137. The second output gear 141 of the differential gearing is coaxial with gear 142 and engages a spur gear annulus 136 secured around the periphery of sleeve member 19.

The output gears 141 and 142 are secured to a pair of coaxial sungears, 152 and 154 respectively, A number of pairs of integrally interconnected planet gears 151 and 153, two such pairs being shown, are supported for free rotation about pivots projecting from a planet-carrier disc 144, and the two planet gears 151 and 153 of each pair mesh with the respective sungears 152 and 154. The planet-carrier disc 144 is pivoted on a shaft 147 rotatable in the fixed frame structure 77, and is peripherally formed with gear teeth 143 which mesh with a drive gear 145 secured on the afore-mentioned drive shaft 53.

With the arrangement so far described, it will be clear that regardless of the rotation of the propeller hub assembly 3 including the outer sleeve member 19, any rotation of drive shaft 53 at the same time as it operates valve member 29 to displace piston 7 and effect a desired change in pitch of the propeller blades 1 as earlier described, will through the differential gearing 137 and the two-way torque-limiting coupling shown, rotate the follower abutment plate 82. The transmission ratios through the mechanical transmission path including the differential gearing 137, yielding drive coupling and the remaining gears shown is so selected with regard to the characteristics of the hydraulic servo-system actuating the piston 7, that any rotation of the drive shaft 53 at the same time as it shifts actuator piston 7 to a desired position, simultaneously moves the follower abutment plate 82 to a corresponding position in which the right-hand face of said plate is just clear of the left-hand face of the piston 7, with the axial distance between the two faces being just sufficient to provide the necessary operating clearance. As earlier explained, it might happen that the piston 7, for some reason as due to leakage of actuating liquid from the hydraulic servo-system, tends to move leftward from the position to which it has been set which leftward movement of the piston would tend to reduce the pitch angle of the blades and ultimately to reverse said pitch angle with extremely dangerous consequences to the aircraft. Any such leftward movement of the piston 7 would be positively prevented after a very slight amount of displacement through abutment of the piston against the follower abutment plate 82.

When the piston 7, as a result of some defect in the control system, abuts the follower abutment plate 82 as just described, the leftward pressure on said plate 82 is high enough to compress the stacked spring washers 88 and force the backing member 85 leftward into abutment with a cooperating shoulder surface in the nose section 6' of the actuator cylinder 6. The mutual friction coefficient between the engaging surfaces of the piston 7 and follower abutment plate 82 is high enough, and the pitch of the screw thread 83 between plate 82 and member 85 is short enough, to prevent rotation of the plate 82. The bodily leftward displacement of parts 82 and 85 until part 85 has abutted the cylinder is extremely short, and does not result in any significant decrease in the pitch angle of blades 1 below the pitch setting commanded by the control mechanism 32, so that said pitch angle retains substantially the value determined by the positioning of the mechanism at the time of failure.

Electric alarm means are provided for signaling the fact that actuator piston 7 has moved into blocking engagement against the follower abutment plate 82, and include a pair of aligned conductive rods 157 and 158 mounted for axial sliding movement within a tubular insulating insert 159 housed within a suitable recess formed in the nose section 6'. A compression spring 161 acting between flanges provided on the adjacent ends of the conductor rods within said insert urges said rods apart, with rod 157 being urged into contact engagement at its outer end against a metallic plate 162 supported by way of an insulating support 163 from the fixed frame structure 77. The outer end of the other rod 158 is normally spaced from the end of a conductive rod 165 which projects from the backing member 85 and is slidable therewith in a passage 166. Thus, when the backing member 85 is axially displaced on compression of spring washers 88 by the pressure of the piston 7 engaging follower abutment plate 82 as explained above, rod 165 is brought into end contact engagement with rod 158, so that an electrically conductive path is established from normally insulated plate 162 through rod 157, spring 161, rod 158 and rod 165 to the mechanism as a whole and thence to electrical ground. A signal lamp (167, FIG. 6) has one terminal connected to a terminal of a D.-C. source 168 whose other terminal is grounded and has its other terminal connected to plate 162, so as to light up when the plate 162 is grounded as just described.

It will be understood that the propeller pitch control mechanism described would normally be applied to a multi-engine aircraft, and FIG. 6 illustrates such an arrangement as applied to a four-engine craft, wherein the four propellers are controlled in pitch angle in parallel from a common command station 34. In FIG. 6, the main components of the four pitch control systems have been shown in outline, with the components of one of the four systems being designated by the same numerals as in FIG. 1 and the corresponding components of the other three systems designated with the same numerals followed by the suffixes *a*, *b* and *c*. In such a system, it is important that failure in the pitch control system of one of the propellers should not affect the operation of the pitch control systems for the other propellers, and this is one of the reasons for the provision of the torque-limiting or command-storing coupling described above as being interposed in the drive path for the follower abutment plate 82. That is, assuming the actuator piston 7 of one of the pitch control assemblies has been moved into engagement with its follower abutment plate 82, the pitch control unit 34 may still be operated to vary as desired the pitch setting of the remaining propellers, and during such actions the spring 127 of the torque-limiting and restoring coupling of the defective assembly will compress as earlier described to take up rotation of the tubular member 107 in either direction, without interfering with the general operation of the system. The actuator piston 7 of the defective assembly may thus remain blocked in abutted condition for any period of time without dangerous consequences.

Nevertheless, means are preferably provided in accordance with a desirable aspect of the invention whereby, in the event of a defect in the main pitch control assembly for one (or more) of the propellers, substantially normal pitch control operations can be resumed for all of the assemblies including the defective one. As shown in FIGS. 1 and 6, a by-pass valve 171 is provided in a by-pass line which directly connects the pressure source 27 with the actuator line 36 supplying pressure to the left-hand actuator chamber 25 and circumvents the control valve 28. By-pass valve 171 is normally closed, but in case the safety stop system of the invention has operated, as indicated e.g. by illumination of the signal lamp 167, valve 171 may be manually (or automatically) opened to apply pressure fluid directly to said actuator chamber 25. The piston 7 is thus forced rightward according to the drawing allowing backing member 85 to be restored by the action of spring washers 88 to its normal position in abutment with stop plate 89 and deenergizing the signal lamp 167. Piston 7 disengages the follower abutment plate 82. At this time, the said follower abutment plate 82 is positioned in accordance with the last pitch setting commanded through the pitch control mechanism and it will be understood that this setting may be different from the pitch setting that prevailed at the earlier instant when the hydraulic system went wrong and the piston 7 first abutted plate 82. Nevertheless, the follower abutment plate 82 will always be restored to its correct final position as required by the present setting of the pitch control mechanism owing to the action of the "command-storing" coupling device including spring 127, which has operated, throughout the period that the piston was blocked against the follower abutment plate 82, to take up as deformations of its spring 127 any control movements of control mechanism 32 which may have occurred in the meantime. As piston 7 is forced out of engagement with its follower abutment plate 82 by operation of by-pass valve 171 and backing member 85 is returned to its normal position, spring 127 will act to restore the respective end rings 125 and 115 into abutment with their respective stops thereby rotating the screw shaft 103 and, through gearing 98–95 rotating the follower abutment plate 82 relative to the backing member 85 until the follower abutment plate has reached a final position which corresponds to the pitch setting required at the instant considered.

If, at this time, the hydraulic mechanism still is defective, the piston 7 will again be forced into pressure engagement with the follower abutment plate 82, but the propeller blades 1 have meanwhile been rotated to their currently required pitch setting. Thus, by-pass valve 171 of the defective hydraulic pitch control assembly may be operated for short periods of time at intervals throughout the period until there has been an opportunity to repair the defective hydraulic circuit, and each such operation of valve 171 will serve to reset the related propeller to its correct pitch setting.

If desired, automatic mechanism including a timer, may be provided which will be set into operation on occurrence of a defect and will act at predetermined intervals, e.g. every 30 seconds, to open by-pass valve 171 momentarily in order to effect the afore-mentioned pitch resetting operations.

It will be apparent that various modifications may be introduced into the single embodiment illustrated and described without exceeding the scope of the invention, and that the invention is useful in various contexts other than of a propeller pitch control system for aircraft. Broadly, the teachings of the invention are applicable in connection with pressure fluid actuators, both of the single- and double-acting varieties, and utilizing both pressure liquids and compressed gas as the pressure fluid therein, whatever their uses. While in the particular application disclosed there was provided but a single follower abutment for preventing unwanted displacement of the actuator piston in only one direction, the pitch-reducing direction, since in this particular application of the invention only this direction of displacement of the actuator piston would be liable to lead to dangerous results (it being noted that an aircraft propeller is usually so designed that its blades tend inherently to rotate in the direction of increasing pitch, but aerodynamic forces tend to rotate the blades towards reduced pitch angles), it will be understood that depending on the particular application to which the invention is put, there may be provided two opposite follower abutments which would be continuously positioned through means generally similar to those disclosed for preventing unwanted displacement of the actuator piston in either direction from its commanded setting. It will also be evident that follower abutments according to the invention may be associated with movable actuator cylinders rather than with a movable actuator piston as here shown. Various other departures from the details described and illustrated will occur to those familiar with the art on having become acquainted with the teachings of the present invention.

What I claim is:

1. A pressure fluid control system comprising a pressure fluid actuator having relatively displaceable parts; pressure fluid means connected with said actuator including means selectively operable for reciprocating one of said parts in a desired one of two directions relative to the other part; control mechanism connected to operate said selective means for commanding a desired setting of said one part relative to the other part; at least one follower abutment associated with said actuator and mounted for displacement in either of said directions relative to said other part and abuttingly engageable with said one part; and a drive connection from said control mechanism to said follower abutment for at all times positioning said abutment at a setting corresponding to said desired setting of said one part, whereby to prevent substantial displacement of said one part away from said desired setting in at least one of said directions through engagement of said one part with said follower abutment.

2. The system defined in claim 1, including a command restoring coupling in said connection which coupling comprises a pair of relatively movable elements respectively drivingly connected with said control mechanism and said follower abutment and yielding means urging said elements to a reference position with respect to each other and deformable on relative movement of said elements away from said reference position, whereby any movements of said control mechanism for altering said desired setting after engagement of said one actuator part with the follower abutment will be taken up as deformations of said yielding means and will be restored on subsequent disengagement of said one part from the follower abutment to displace said abutment to a new setting corresponding to the altered desired setting commanded by said control mechanism.

3. The system defined in claim 1, wherein said follower abutment comprises a plate mounted coaxially with said actuator for axial displacement relative to said actuator parts and engageable with a side of said one actuator part.

4. The system defined in claim 3, wherein said follower abutment plate is threadedly mounted for rotation about an axis coaxial with said actuator, and said drive connection includes gearing for rotating said plate so as to displace it axially relative to the actuator.

5. The system defined in claim 1, wherein said follower abutment is mounted for limited axial displacement by said one actuator part on engagement therewith, said system further comprising resilient means yieldingly opposing such displacement.

6. A pressure-fluid positional control system comprising a pressure fluid actuator having relatively displaceable cylinder and piston parts; pressure fluid flow means connected to the actuator cylinder; a pressure fluid source; a control valve connected to said source and said flow means and selectively displaceable from a neutral position to control said flow means for displacing one of said actuator parts relative to the other part; a positional follow-up connection from said one actuator part to said valve for restoring the valve to neutral position after said one part has been displaced to a desired setting; control mechanism connected to displace said valve for commanding a desired setting of said one part; a follower abutment plate threadedly mounted for screwing rotation about an axis coaxial with said actuator parts so as to be axially displaced with respect thereto and abuttingly engageable with said one part; and a drive connection from said control mechanism to said abutment plate including means for rotating said plate on operation of said mechanism so as at all times to position said plate at a setting corresponding to said desired setting of said one part.

7. The system defined in claim 6, including a command-restoring coupling in said drive connection which coupling comprises a pair of relatively displaceable elements respectively drivingly connected with said control mechanism and said abutment plate, and yielding means urging said elements to a reference position with respect to each other and deformable on relative movement of said elements in either direction away from said reference position.

8. The system defined in claim 6, including a command-restoring coupling in said drive connection which coupling comprises an input element connected for rotation from said control mechanism, an output element connected for rotating said follower abutment plate, a member having a reversible threaded connection with one of said elements, means connecting said member with the other of said elements for bodily rotation therewith but for axial displacement of said member relative to said other element, a first stop simultaneously engageable with respective stop surfaces of said member and said other element, a second stop simultaneously engageable with other respective stop surfaces of said member and said other element and directed oppositely to said first stop surfaces, and spring means urging both said stops into simultaneous engagement with both respectively related stop surfaces, whereby rotation of said member relative to said one element in one or the other direction will cause relative movement of said stops in a direction to deform said spring means.

9. The system defined in claim 8, wherein said elements and said member are coaxially aligned with one another and with said actuator parts and follower abutment plate.

10. A pressure-fluid control system for controlling the position of apparatus during rotation of said apparatus about an axis, comprising structure bodily rotatable with said apparatus about said axis; a pressure fluid actuator having cylinder and piston parts bodily rotatable with said structure about said axis and one of said parts being axially displaceable with respect to the other part along said axis; a relatively stationary pressure fluid source; a relatively stationary control valve connected to said source; fluid flow means connected to said valve and including rotating seal means for sealing connection with said rotatable actuator cylinder, whereby selective displacement of the control valve in one or the other direction will control the flow of fluid through said flow means to said actuator cylinder so as to displace said one actuator part in a corresponding direction relative to the other part; relatively stationary control mechanism connected to displace said control valve for commanding a desired setting of said one actuator part; a follower abutment bodily rotatable with said structure and axially displaceable relative thereto and abuttingly engageable with said one actuator part; and a drive connection from said control mechanism to said follower abutment including an output element rotatable to displace said abutment relative to said actuator parts and an input element bodily rotatable with said structure and differentially rotatable relative to said structure for rotating said output element and displacing said abutment, and differential gearing having a first input member rotated from said control mechanism, a second input member rotated from said structure and an output member connected for rotating said input element, whereby operation of the control mechanism to displace said valve and command a desired setting for said one actuator part will simultaneously impart differential rotation to said input element relative to said structure for displacing said follower abutment to a position corresponding with said desired setting, whereby to prevent substantial displacement of said one actuator part from said desired setting through engagement of said one part with the follower abutment.

11. The system defined in claim 10, including a command-restoring coupling in said drive connection interposed between said input and output elements, and including means rotatable with said respective elements and axially displaceable with respect to each other in one or the other of two opposite directions from a reference position, and yielding means urging said last means to said reference position and deformable on relative movement thereof in either of said directions away from said reference position, whereby any movements of the control mechanism for altering said desired setting after engagement of said one actuator part with said follower abutment will be stored as deformations of said yielding means and will be restored on subsequent disengagement of said one part from the follower abutment to displace said abutment to a new setting corresponding to the altered desired setting commanded by said control mechanism.

12. The system defined in claim 11, wherein said follower abutment comprises a plate, threaded means mounting said plate for screwing rotation about said axis relative to the actuator parts, and means for rotating said plate from said output element of the drive connection for displacing said plate axially relative to said actuator parts.

13. The system defined in claim 12, including means mounting said threaded means for limited axial displacement relative to said other actuator part, and spring means for restraining such displacement.

14. The system defined in claim 10 wherein said rotatable unit of apparatus comprises an aircraft propeller having a plurality of blades individually rotatable about center lines thereof for adjusting the blade pitch angle, mechanism is provided connecting said one actuator part with said blades for simultaneously rotating said blades about said center lines on axial displacement of said one actuator part, and said follower abutment plate is engageable with said one actuator part in an avial direction to prevent displacement of said one part in a direction causing a reduction in blade pitch angle.

15. The system defined in claim 6, including normally closed by-pass valve means connecting said pressure source with said pressure fluid flow means in by pass relation with said control valve whereby opening of said by-pass valve means will displace said one actuator part in a direction to disengage said one part from said follower abutment.

References Cited by the Examiner

UNITED STATES PATENTS

| | | |
|---|---|---|
| 2,258,094 | 10/1941 | Keller. |
| 2,773,485 | 12/1956 | Geyer _____ 92—17 |
| 2,856,012 | 10/1958 | Frankland _____ 170—160.32 |
| 3,143,175 | 8/1964 | Elmes et al. _____ 170—160.32 |

FOREIGN PATENTS

| | | |
|---|---|---|
| 150,930 | 4/1953 | Australia. |

SAMUEL LEVINE, *Primary Examiner.*

E. A. POWELL, Jr., *Assistant Examiner.*